T. G. MOLLINGER.
APPARATUS FOR THE STERILIZATION OF MILK OR OTHER LIQUIDS.
APPLICATION FILED OCT. 14, 1909. RENEWED APR. 16, 1912.
1,045,056.
Patented Nov. 19, 1912.
2 SHEETS—SHEET 2.
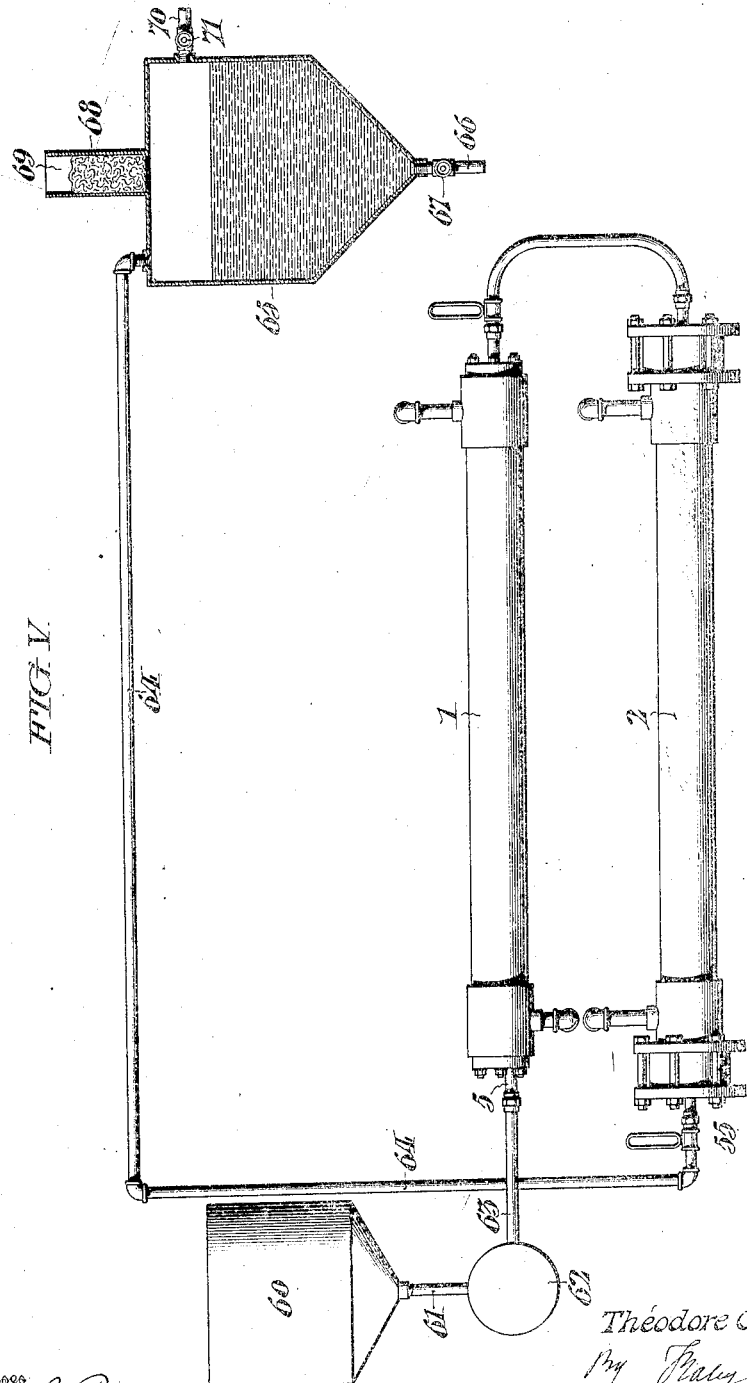

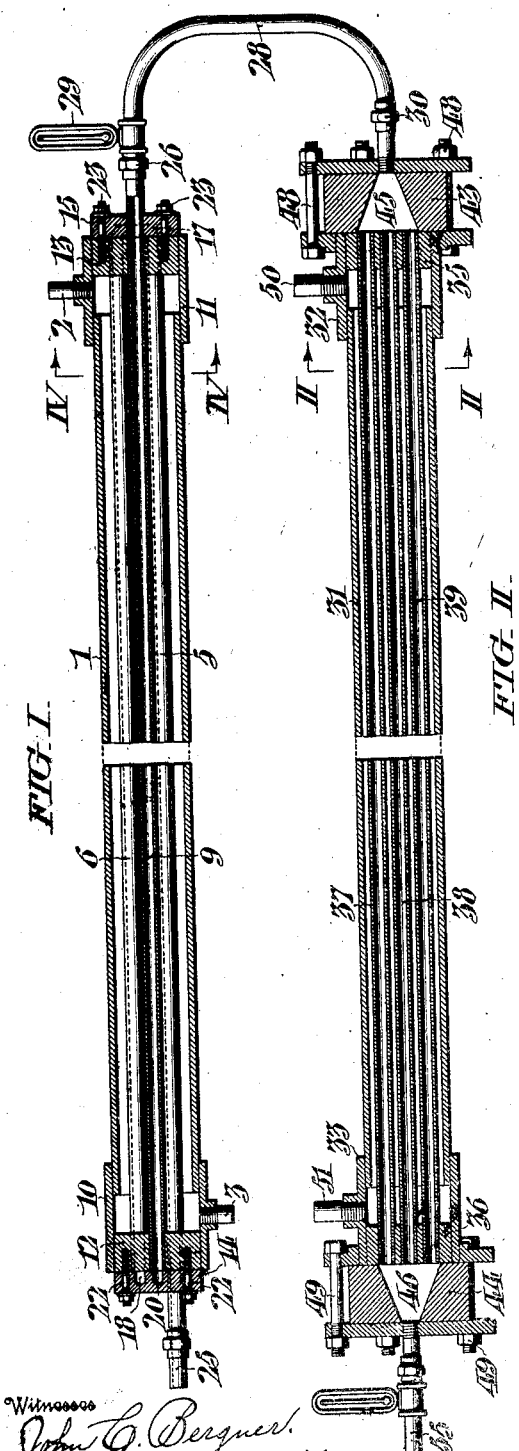

UNITED STATES PATENT OFFICE.

THÉODORE G. MOLLINGER, OF THE HAGUE, NETHERLANDS, ASSIGNOR, BY MESNE ASSIGNMENTS, TO GENERAL STERILIZING COMPANY, OF WILMINGTON, DELAWARE, A CORPORATION OF DELAWARE.

APPARATUS FOR THE STERILIZATION OF MILK OR OTHER LIQUIDS.

1,045,056.     Specification of Letters Patent.     Patented Nov. 19, 1912.

Application filed October 14, 1909, Serial No. 522,610. Renewed April 16, 1912. Serial No. 691,257.

*To all whom it may concern:*

Be it known that I, THÉODORE G. MOLLINGER, of The Hague, Netherlands, whose present post-office address is No. 263 West Rittenhouse street, Germantown, in the city of Philadelphia, county of Philadelphia, and State of Pennsylvania, have invented a certain new and useful Apparatus for the Sterilization of Milk or other Liquids, whereof the following is a specification, reference being had to the accompanying drawings.

The apparatus is especially adapted for the conduct of a process of sterilization of milk which forms the subject of Letters Patent of the United States issued in my name as assignor, No. 1,005,275, dated October 10, 1911, and hence, in the following description, milk will be referred to as the typical liquid undergoing treatment. It must be understood however, that the use of the apparatus is not limited to such process, but is susceptible of application to other processes which involve the rapid and momentary heating and the immediate cooling of a stream of liquid.

In the drawings Figure I, represents a vertical longitudinal section through the apparatus, Fig. II, being a transverse section, on an enlarged scale, through the lower portion thereof on the lines II, II, of Fig. I. Fig. III, is an end view of the upper portion of the apparatus, as seen from the left-hand end of Fig. I, while Fig. IV, is a transverse section through said upper portion on the line IV, IV, of Fig. I, the scale of Figs. III, and IV, being similarly enlarged above that of Fig. I. Fig. V, is a diagrammatic view, partly in side elevation and partly in vertical section, illustrating the general organization of the apparatus and its connected parts, the scale of certain portions of the apparatus in said diagrammatic view being exaggerated with relation to the scale of other parts, as will be hereinafter explained.

Referring now to said drawings, I will first describe in detail the heating element proper and the cooling element proper, since the general organization of the apparatus, as a whole, will be better understood after the structural characteristics of these parts have been explained.

The heating element comprises a closed cylindrical jacket 1, preferably of four inch iron pipe, having enlarged extension pieces 10, and 11, respectively, at its opposite ends, and provided with an inlet pipe 2, for steam, and an exit pipe 3, therefor, the former being connected with any convenient source of supply adapted to deliver steam at the high temperature hereinafter mentioned, and the exit pipe being controlled by a proper trap, so as to maintain the steam within the jacket at the desired pressure and consequent temperature. The source of steam supply, and the trap device are not represented, since their construction is well understood. Within the enlarged ends 10, and 11, of the jacket, terminal blocks 12, and 13, respectively, are secured, said blocks being adapted to receive the ends of a plurality of tubes, in this instance five in number, represented respectively at 5, 6, 7, 8, and 9. Said tubes which are preferably of copper, about seven-sixteenths of an inch in internal diameter and ten feet long, are open at the ends so as to be completely accessible for cleaning the interior thereof. They are provided with means of communication alternating at the respective ends so as to form a single continuous channel through the apparatus, said means of communication being as follows:—Two external heads 14, and 15, respectively, are removably secured against the outer faces of the blocks 12, and 13, forming a close joint therewith, and are held in position by means of the screw bolts 22, and 23, respectively. Said heads are provided, on their inner faces, (or those adjacent to the respective blocks), with short channels, whose end portions register with the orifices of respective pairs of tubes; thus at the left-hand end of Fig. I, the channels 18, and 20, are shown in cross section, said channels being also shown in dotted lines in Fig. III. At the right-hand end of Fig. I, the channels are not shown by reason of the plane of the section, but in Fig. IV, their position is indicated by the dotted lines 17, and 19.

The system of communication is as follows:—The pipe 5, (whose extremity at the left-hand end of Fig. I, is the inlet for the milk), communicates at the other end with the vertical channel 17, leading to the adjacent end of the pipe 6. At the left-hand end of the pipe 6, the channel 18, communicates therewith and with the adjacent end of the pipe 7. Returning again to the right-hand end, the channel 19, communicates with that end of the pipe 7, and with the adjacent end of the pipe 8. Returning again to the left-hand end, the channel 20, communicates with that end of the pipe 8, and the adjacent end of the pipe 9. A continuous conduit is, therefore, afforded throughout the whole of the five lengths of pipe, commencing at the inlet end, to which the supply pipe 25, leading from the milk reservoir, is connected, and terminating at the exit end, to which the delivery pipe 28, is attached at the joint 26. Said delivery pipe is provided with a thermometer device 29, by means of which the temperature of the milk can be ascertained immediately at the exit from the heating element.

The cooling element comprises a cylindrical jacket 31, preferably of four inch iron pipe, having the extensions 32, and 33, and terminal blocks 35, and 36, and inclosing a group of five copper pipes 37, 38, 39, 40, and 41, respectively, whose ends are received within and extend through said blocks. Heads 43, and 44, respectively are removably secured by means of the bolts 48, and 49, respectively, to the steam jacket, and said heads are provided respectively with chambers 45, and 46, having the conical form shown, whose portions of greatest area communicate at each end with the orifices of the entire group of pipes just described. The delivery pipe 28, for the hot milk, leads through a joint 30, into the apex of the chamber 45, and the discharge pipe 55, leading from the cooling element, communicates with the apex of the chamber 46. Said discharge pipe 55, is also provided with a thermometer device arranged in close proximity to the chamber, in order that the temperature of the milk, immediately on its passage from the cooling element, may be accurately determined.

Water inlet and exit pipes 51, and 50, respectively, are arranged to communicate with the interior of the jacket 31, a supply of water of the required temperature being conveniently arranged with relation to the inlet pipe 51.

Referring now to the diagrammatic view of Fig. V, the general organization of the apparatus, whose heating and cooling elements have been described, is as follows:— A supply tank 60, adapted to contain a large body of the liquid to be treated, communicates by means of the pipe 61, with a pump, conventionally indicated at 62, which is adapted to force the liquid through the heating element, at high pressure and with considerable velocity. The delivery pipe 63, of said pump, leads to the inlet pipe 5, of the heating element, whose jacket is shown at 1. The discharge pipe 55, of the cooling element, whose jacket is shown at 2, is connected by means of a pipe 64, with the discharge reservoir 65, having at its bottom an outlet nozzle 66, controlled by a valve 67, and at its upper portion a vent pipe 68, which is preferably screened by a loosely applied mass of cotton 69, so as to permit escape of air or vapor from the interior, while preventing the entrance of bacteria or other foreign bodies. I also prefer to provide a steam inlet pipe 70, controlled by a valve 71, by means of which the interior of the reservoir 65, may be from time to time thoroughly sterilized and cleaned. In said diagrammatic view, the proportions of the heating and cooling elements are relatively much exaggerated with relation to the dimensions of the reservoirs 60, and 65.

In the operation of the apparatus the liquid is forced with considerable velocity through the relatively long conduit of the heating element, so that where the application of a high degree of heat is desired, the exposure to said heat may be but momentary, and yet very complete. On entering the cooling element, the stream of liquid is subdivided and progresses uniformly and at a lower velocity from that end where the temperature of the cooling medium is warmest, toward that end where said medium is coldest, thus gradually and progressively reducing the temperature.

Considering the above described apparatus as a whole, it will be noted that it is characterized by a peculiar distinction between the organization of the heating element and that of the cooling element. Assuming total length of the pipes in each of these elements, to be substantially the same, the pipes of the heating element are arranged in series, so as to form an attenuated conduit of considerable length, while the group of pipes in the cooling element, are arranged in multiple, thus forming a plurality of individual shorter conduits, whose combined length is similar to that of the first mentioned conduit. Such an apparatus is peculiarly adapted to the rapid and thorough heating of an attenuated body of liquid, forced into it under considerable pressure, and to the subsequent cooling of said liquid, the volumes of liquid passing through the two portions of the apparatus during a given period, being similar, but the velocity in one being greater than that in the other. This feature I believe to be new in apparatus of this character, and therefore broadly claim it:

Among the incidental advantages of the structure above described, is the facility of access to the interior of both conduits for cleaning purposes.

Having thus described my invention, I claim:—

1. The combination, with a jacket; of a plurality of pipes mounted therein, having means of communication at alternate ends, whereby they are disposed in series to form an attenuated conduit of relatively great length; an inlet pipe leading to one end of said conduit; a delivery pipe leading from the other end of said conduit; a second jacket; a second group of pipes substantially similar in number and area to said first mentioned group, but arranged in multiple within said second jacket; means for connecting said delivery pipe to one end of all the pipes of said second group; a discharge pipe leading from the other ends of the pipes of said second group; means for admitting a heating medium to the interior of said first mentioned jacket and for discharging the same therefrom; and means for admitting a cooling medium to the interior of said second mentioned jacket at one end thereof and discharging the same therefrom at the other end thereof, substantially as set forth.

2. The combination, with a jacket; of a plurality of pipes secured therein, and open at their respective ends; removable heads, having channels adapted to afford communication between the adjacent orifices of pairs of pipes alternately at the opposite ends to form a continuous conduit; means for securing said heads in position; an inlet pipe leading to said conduit; a delivery pipe leading from said conduit; a second jacket; a plurality of pipes secured therein and open at their respective ends; heads having chambers adapted to communicate with the ends of said pipes; one of said chambers communicating with said delivery pipe; a discharge pipe leading from the other of said chambers; means for admitting and discharging a heating medium to and from said first mentioned jacket; and means for admitting and discharging a cooling medium to and from said last mentioned jacket at the respective ends thereof, substantially as set forth.

3. The combination, of a heating element comprising a casing and a plurality of pipes disposed therein in series to form an attenuated conduit of relatively great length; a cooling element comprising a casing and a plurality of pipes substantially similar in area to said first mentioned pipes, but disposed in multiple to form a subdivided conduit of relatively short length; means for admitting a cooling medium at one end of said casing and for discharging said medium at the other end thereof; a supply reservoir, for liquid; a source of pressure, such as a pump, communicating with said supply reservoir and leading to the inlet end of said pipes arranged in series; a connecting pipe leading from the discharge end of said pipes to the inlet ends of said pipes arranged in multiple; a discharge pipe leading from the outlet ends of said pipes arranged in multiple; and a discharge reservoir communicating with said discharge pipe, substantially as set forth.

In testimony whereof, I have hereunto signed my name, at Philadelphia, Pennsylvania, this thirtieth day of September, 1909.

THÉODORE G. MOLLINGER.

Witnesses:
JAMES H. BELL,
E. L. FULLERTON.